(12) United States Patent
Monden et al.

(10) Patent No.: US 12,061,811 B2
(45) Date of Patent: Aug. 13, 2024

(54) MULTI-DEVICE SYNCHRONIZATION SYSTEMS AND METHODS

(71) Applicant: Jabil Inc., St. Petersburg, FL (US)

(72) Inventors: Jason Monden, St. Petersburg, FL (US); Seth Green, St. Petersburg, FL (US); Geoff Mulligan, St. Petersburg, FL (US); Erik Boone, St. Petersburg, FL (US)

(73) Assignee: Jabil Inc., St. Petersburg, FL (US)

( * ) Notice: Subject to any disclaimer, the term of this patent is extended or adjusted under 35 U.S.C. 154(b) by 204 days.

(21) Appl. No.: 17/518,831

(22) Filed: Nov. 4, 2021

(65) Prior Publication Data

US 2022/0137821 A1 May 5, 2022

Related U.S. Application Data

(60) Provisional application No. 63/109,665, filed on Nov. 4, 2020.

(51) Int. Cl.
*G06F 3/06* (2006.01)

(52) U.S. Cl.
CPC ............ *G06F 3/065* (2013.01); *G06F 3/0605* (2013.01); *G06F 3/0647* (2013.01); *G06F 3/0659* (2013.01); *G06F 3/067* (2013.01)

(58) Field of Classification Search
None
See application file for complete search history.

(56) References Cited

U.S. PATENT DOCUMENTS

2020/0202319 A1* 6/2020 Forutanpour ......... G07F 15/006

* cited by examiner

*Primary Examiner* — Michael Alsip
(74) *Attorney, Agent, or Firm* — Young Basile Hanlon & MacFarlane, P.C.

(57) ABSTRACT

Methods and systems for multi-device, multi-channel cloud-based differential data synchronization. The system includes a server system, a source device including a first migration application instance, the source device configured to execute the first migration application instance to initiate a data transfer process with the server system to transfer user data to the server system upon a user ordering a target device, and the target device including a second migration application instance, the target device configured to execute the second migration application instance to initiate a data transfer process with the server system to transfer the user data to the target device, and execute a second data transfer with the source device to finalize data synchronization when the user is picking up the target device.

20 Claims, 5 Drawing Sheets

MULTI-DEVICE SYNCHRONIZATION SYSTEMS AND METHODS

CROSS-REFERENCE TO RELATED APPLICATION

This application claims priority to and the benefit of U.S. Provisional Patent Application No. 63/109,665, filed Nov. 4, 2020, the entire disclosure of which is hereby incorporated by reference.

TECHNICAL FIELD

This disclosure relates to data synchronization when user changes user device.

BACKGROUND

Users upgrade, trade-in, or otherwise change devices such as, but not limited to, mobile phones, tablets, laptops, desktops, and the like. A data transfer between the devices is typically needed so that the new or target device has the appropriate user data from the old or source device. This data transfer process can be tedious, unreliable, and time-consuming, among other issues.

SUMMARY

Disclosed herein are multi-device synchronization systems and methods for transferring data from an end user source device to an end user target device.

In implementations, the system includes a server system, a source device including a first migration application instance, the source device configured to execute the first migration application instance to initiate a data transfer process with the server system to transfer user data to the server system upon a user ordering a target device, and the target device including a second migration application instance, the target device configured to execute the second migration application instance to initiate a data transfer process with the server system to transfer the user data to the target device, and execute a second data transfer with the source device to finalize data synchronization when the user is picking up the target device.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
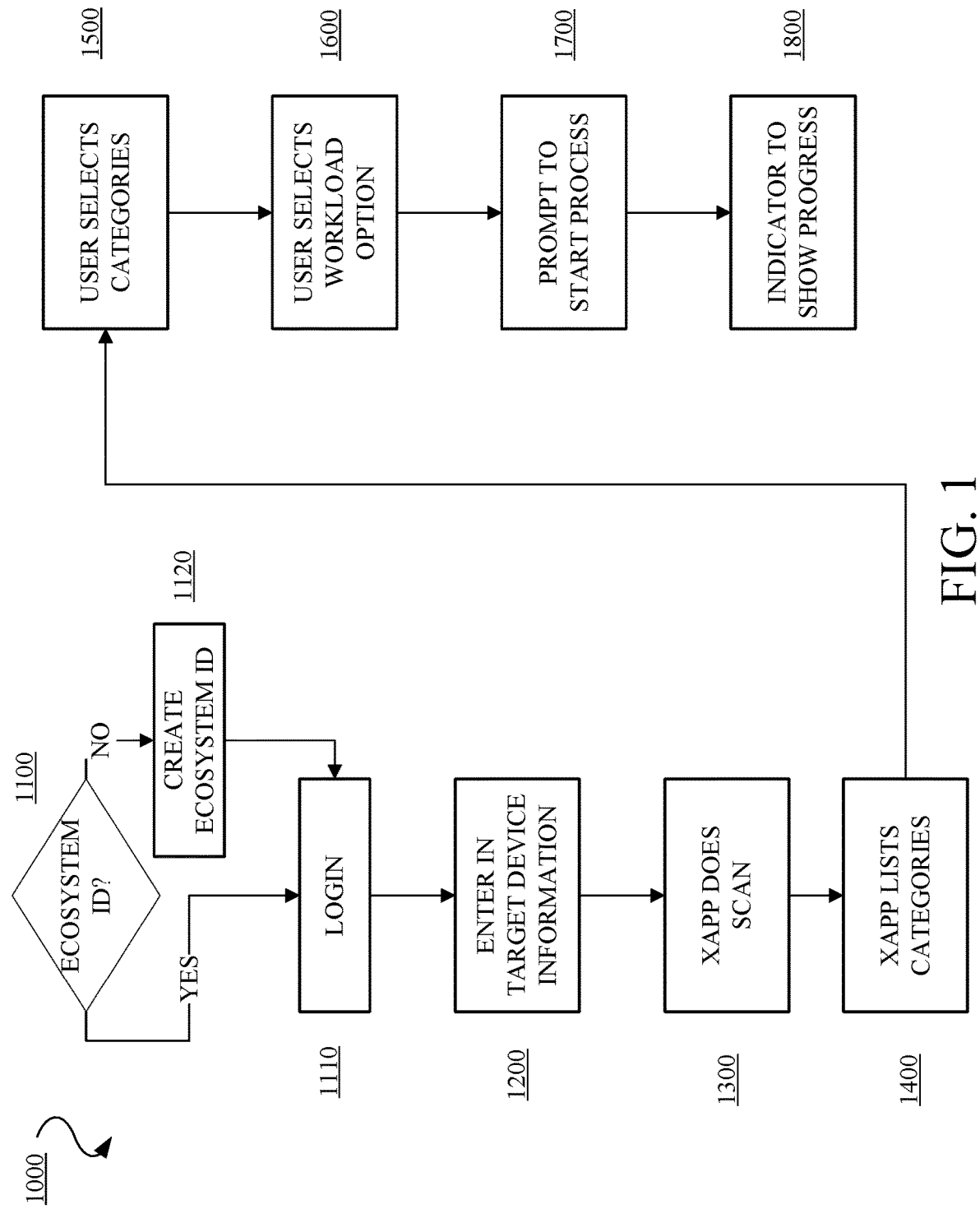
FIG. 1 is a flow chart of an example method for multi device synchronization in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertain-
} ing, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods, devices and systems for multi-device, multi-channel cloud-based differential data synchronization. As part of the process to upgrade, trade-in, exchange, or transfer end user devices, including but not limited to, mobile phones, tablets, laptops, and desktop computers, a user must move data between these devices. The systems and method described herein can reduce transmission time for the data transfer between the devices.

There are multiple embodiments and use-cases that describe systems and methods for each experience. These embodiments describe methods for when a user of the device initiates the process on their own or if a third party, such as a store clerk, initiates the transfer process. The system is brand and device agnostic, meaning that it can be used on any brand of device, between devices of different brands, and between devices of different types. For example, the system can be used between two Apple® phones, between an Apple phone and a Samsung® phone, or between a Huawei® phone and a Samsung tablet.

In some implementations, an in-store experience applies to multiple channels including a branded store such as the Apple Store or the Huawei store, 3rd party/channel stores such as Costco® or Best Buy®, or telco stores such as Verizon®, T-Mobile®, or AT&T®. In the in-store experience, the clerk may initiate the order from the order system. The clerk may create a new brand-specific user ID (e.g., an Apple ID or a Samsung ID) (referred to herein as an "ecosystem ID") or enter an existing ecosystem ID tied to the order. The clerk may then walk the user through the transfer application process as described herein.

In some implementations, a user-initiated experience consists of a user purchasing a device online. This may include ordering from the brand owner (e.g., the Apple website or the Samsung website), the 3rd party/channel (e.g., Best Buy's website), or the Telco company (e.g., Verizon's website). As part of completing the order via the Internet, the user would be instructed to either create a new ecosystem ID or to enter an existing ecosystem ID to be used for the order. The user would then be directed to download a transfer application ("XAPP") on their existing device.

In implementations, the XAPP would be made available on applicable application stores (e.g., Apple App Store or Google® Play Store). The user will download and install this XAPP on their existing device. The XAPP may include a login screen in which the user will use the ecosystem ID associated with the order. Upon logging in, the user may be prompted to confirm the new device that has been ordered as being the correct target device for the synchronization. Once the target device has been selected and confirmed, the user may be prompted to begin the data transfer, with a number of categories to select for the transfer, such as contacts, photos, videos, documents, and applications (if they are available on the target device). As part of this process, the user may be provided with certain terms and conditions that he/she must accept to proceed.

In implementations, once the process is initiated, the device will begin syncing to the migration cloud. The migration cloud can be facilitated in a number of ways. The migration cloud can be the brand's cloud platform (e.g., Apple's cloud (iCloud) or Samsung Cloud) or simply a secure cloud-based target. There can be two core areas of data transfer. One area includes items to capture from the current or legacy device to reproduce or recreate on the target device. These may be things such as contacts and applications. This represents activities such as recreating contacts the proper way on the target device and installing the appropriate applications on the target device. The second area includes items to copy. This may be user specific data/information such as pictures, videos, files, and documents. The synchronization will keep track of differentials based on track changes for the data being replicated, moved, recreated, or copied.

There may be a background process as part of the procurement and order/build that will notify the user that they must start this process in a timely fashion in order to receive a prepopulated device with improved transfer cutover rates.

There are multiple fulfillment scenarios that apply to the rest of the transfer process including factory build/order or store/other inventory order.

In implementations, the target device may also have a version of the XAPP installed for the correct order assigned ecosystem ID.

In implementations, the user may be alerted to the appropriate timeline to have installed the XAPP and initiated the transfer/sync process.

In implementations, the factory process may be altered such that new or target devices, upon build completion, have high-speed Internet connectivity for a period of time, such as 24 hours, prior to shipment. This would allow substantial time for pre-population of data on the new devices. Once the new device is shipped, the user device (current or source device) may continue to transfer data to the migration cloud in a time-stamped changed block manner. When the device arrives at the target location, the user may be alerted that it has arrived. The target store may power on the new device such that it connects to the Internet to continue to differentially sync from the migration cloud. Once the user arrives to pick up the new device at the store, both devices will be put into a sync mode for a final sync of the data that had not yet been transfer to the new device. This may include finalizing the sync on the source device. When this differential sync is complete on the source device, the XAPP may instruct the user to shut it down. The XAPP on the new device may alert the user when the final sync, transfer, and installation is complete. At this point, the user can verify the data transfer was complete, and remove the XAPP.

In implementations, if the new device is shipped directly to the end-user, the user may be provided instructions on how to initiate the final sync and cutover. The process will follow as above.

In implementations, if the new device is coming from inventory, or already at a store, the new device should have the XAPP already installed, and the transfer initiated.

The XAPP may automatically notify the user of estimated final device cutover times. The cutover time may depend on new data usage at the source and the network transfer speeds available both at the source and new devices. The system may provide reduced final cutover time (e.g., less than 10 minutes). The XAPP can also work in conjunction with a local device for final synchronization.

FIG. 1 is a flow chart of an example method 1000 for multi device synchronization in accordance with embodiments of this disclosure. A user may find a local version of the XAPP in a respective app store. Upon installing the XAPP on the source device, the user is initially asked for an ecosystem ID to login into the XAPP, which provides access and integration into procurement, manufacturing, and cloud related systems (1100). The user log's in with an existing ecosystem ID if available (1110) or creates a new ecosystem ID (1120) to login (1110). The XAPP may have or require minimal user interaction. The user can enter in the target device information including, but not limited to, target device type and operating system (1200). The XAPP does an auto discover on what a user has on the source device (1300). XAPP creates an internal mapping that will tell it how to categorize the data it copies for suitability to be recreated and copied onto the target device (1400). For example, the XAPP can list the categories to be migrated, including, but not limited to, contacts, files, pictures, videos, and applications. The user can select which categories to migrate (1500). In some implementations, the user may have the option to direct the XAPP as to how it should prioritize the workloads against ongoing use of the source and/or target device (1600). For example, the user can select from balanced, prioritize migration, run in background, prioritize all other usage, balanced, and the like. In an example, for the balanced option, the XAPP will dynamically balance available resources to prioritize migration when possible but to not impact other usage. The XAPP may watch for CPU, memory, and network usage on the device, and use a threshold (for example, 70%) to maintain migration activities. If resources are above the threshold, migration activities may be idled. Otherwise, migration processes may ramp up to total system resource consumption no higher than the threshold. The user is prompted to initialize the migration process (1700). This starts the process of copying or replicating the source device data to the migration cloud and the target device, as appropriate and applicable. The XAPP will display or provide an indicator from the migration cloud service or platform regarding the migration process (1800). For example, one or more prompts may be received indicating, starting of migration process, migration process pending, migration process paused, error message, or migration process complete.

There may be multiple experience scenarios for a user to experience the reduced speed of synchronization and setup of their new or target device (referred to herein as "target").

Figure 2:
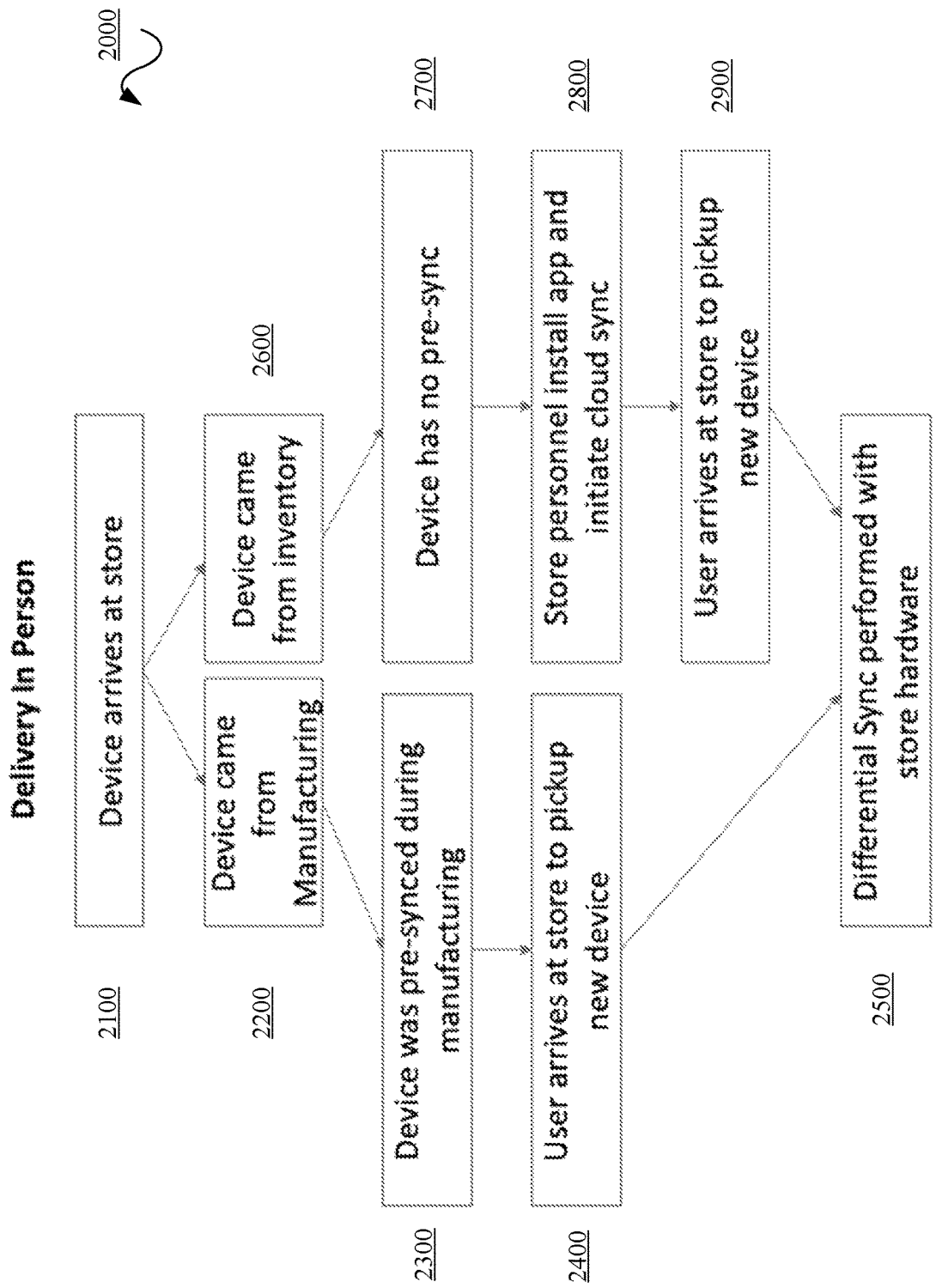
FIG. 2 is a flow chart of an example method for multi device synchronization for in-person delivery in accordance with embodiments of this disclosure.

FIG. 2 is a flow chart of an example method 2000 for multi device synchronization for in-person delivery in accordance with embodiments of this disclosure. The method 2000 is applicable whether a user initiated an order online, via a $3^{rd}$ party, or in a corporate store. The method 2000 may occur when the user picks up the device in-person. For example, approximately 90 percent or more of the data may have already been copied and pre-populated onto the target device, including download and installation of applications, when the target device arrives at the store. Any final changes/updates that occurred since the target device was last synced (prior to shipment to the store), may be copied locally via a multi-channel hardware replication device, which uses available antennae, hardware connections, and protocols, which may include for example Bluetooth®, Apple's AirDrop® or Android's Nearby Share, to transfer data. Combinations of local and cloud based data transfer may also be used, which may further decrease transfer time. Integration between the XAPP and the hardware replication device will allow the hardware device to be aware of the remaining changes that need to be copied.

With respect to FIG. 2, the target device arrives at a store (2100). In one path, the target device came from manufacturing (2200). In this path, the target device was pre-synced during manufacturing based on execution of method 1000 in FIG. 1 (2300). The user arrives at the store to pick-up the target device (2400). A differential sync is performed at the store using a combination of store hardware, replication hardware, cloud-based service, or combinations thereof (2500). In another path, the target device came from inventory (2600). In this path, the target device was not pre-synced (2700). The target device is loaded with the XAPP and synchronization is initiated, by the store personnel, with the migration cloud service based on execution of method 1000 in FIG. 1 (2800). The user arrives at the store to pick-up the target device (2900). A differential sync is performed at the store using a combination of store hardware, replication hardware, cloud-based service, or combinations thereof (2500). As such, methods 1000 and 2000 may provide reduced final cutover time (e.g., less than 10 minutes).

Figure 3:
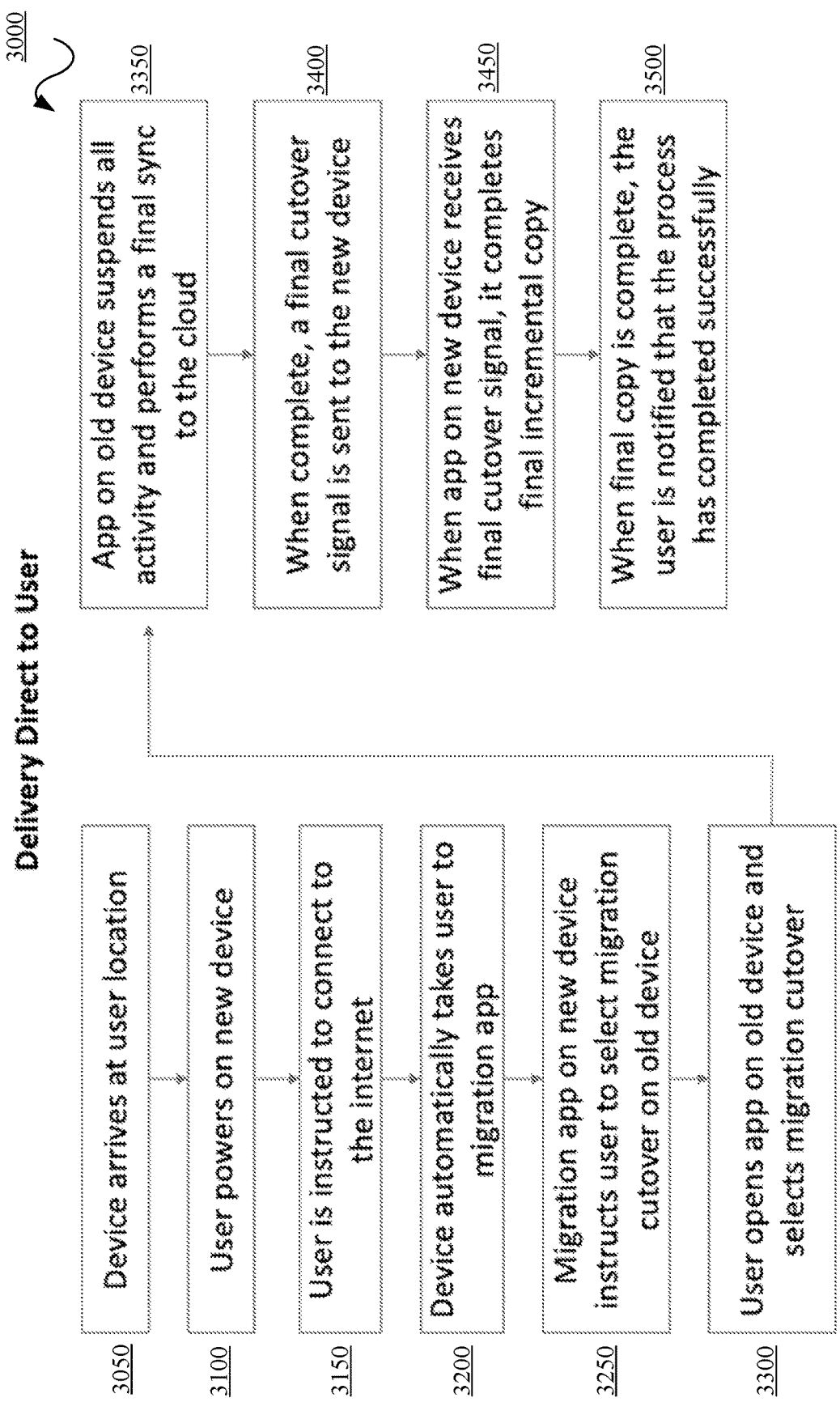
FIG. 3 is a flow chart of an example method for multi device synchronization for direct delivery to user in accordance with embodiments of this disclosure.

FIG. 3 is a flow chart of an example method 3000 for multi device synchronization for direct delivery to user in accordance with embodiments of this disclosure. In this example, the migration cloud service is an intermediary between the XAPPs running on the source and target devices. Each XAPP may run the device in a protected mode where no other activity can happen during a final cutover between the source and target devices. Similar to the in-store experience described in FIG. 2, the target device is prepopulated with content from the source device when it arrives directly at the user's premises. As an example, the target device may be prepopulated with approximately 90 percent or more of the content from the source device via the migration cloud service based on execution of method 1000 in FIG. 1. As such, methods 1000 and 3000 may provide reduced final cutover time (e.g., less than 10 minutes).

With respect to FIG. 3, the target device arrives at a user location (3050). The user powers on the target device (3100). The user connects the target device to the Internet (3150). The target device and/or operating system initiates the XAPP (3200). XAPP instructs user to select migration cutover or final sync from the source device (3250). User initiates XAPP on the source devices and selects or confirms the migration cutover or final sync (3300). The XAPP on the source device suspends activity on the source device and executes final sync (3350). Upon final sync completion, the source device sends a signal or prompt to the XAPP on the target device (3400). The XAPP on the target device completes the final sync from the migration cloud service upon receiving the signal from the source device (3450). The XAPP at the target device will display or provide an indicator from the migration cloud service or platform upon completion of the migration process (3500).

Figure 4:
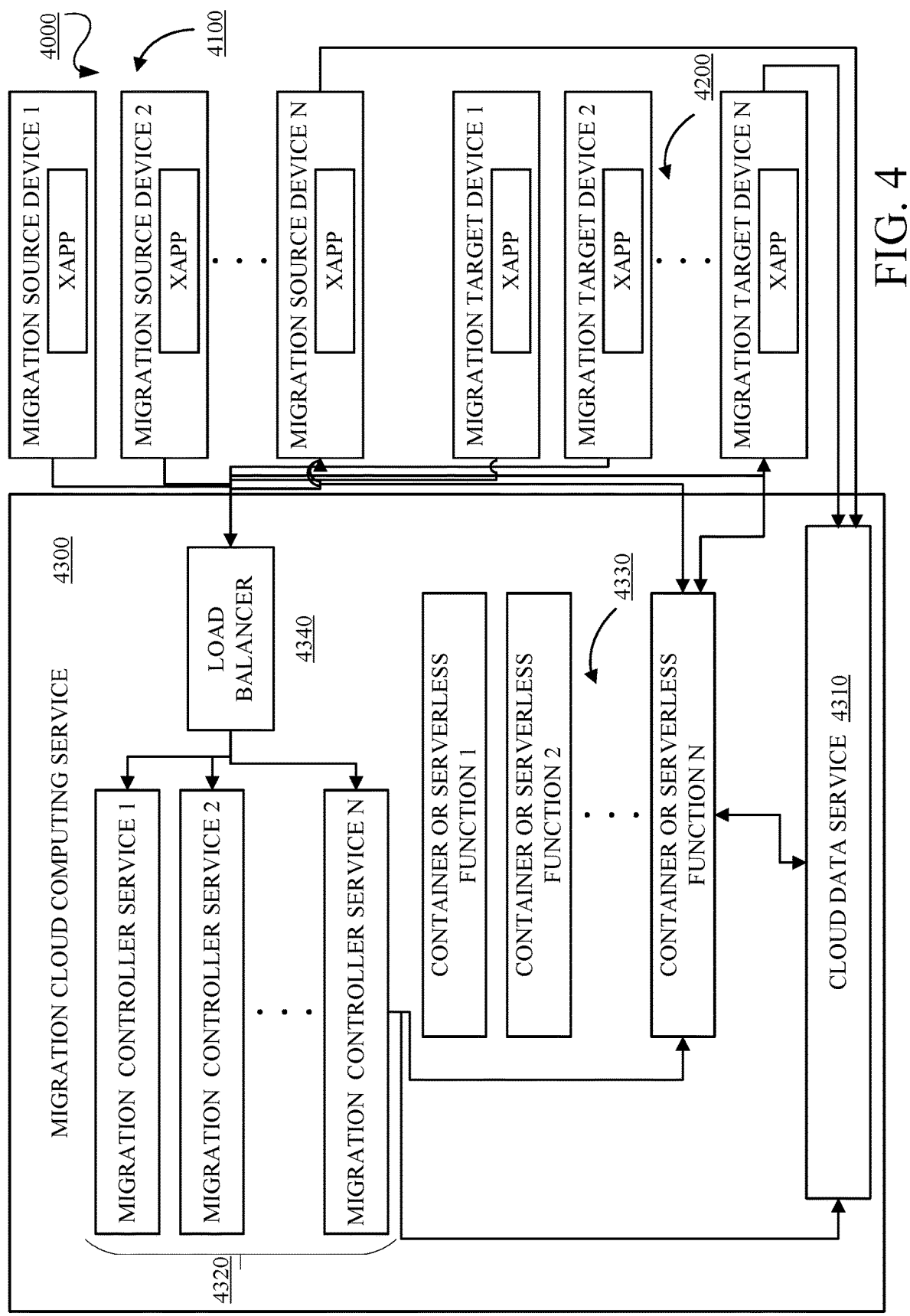
FIG. 4 is a block diagram of an example multi device synchronization architecture in accordance with embodiments of this disclosure.

FIG. 4 is a block diagram of an example multi device synchronization architecture or migration cloud service or platform 4000 in accordance with embodiments of this disclosure. The migration architecture 4000 includes migration source devices 1 . . . N 4100, migration target devices 1 . . . N 4200, and a migration cloud computing service 4300. The migration cloud computing service 4300 can include a cloud data service 4310, a migration controller with instances of migration controller service 1 . . . N 4320, container or serverless function 1 . . . N 4330, and a load balancer 4340. The migration architecture 4000 can execute or implement the methods 1000-3000 of FIGS. 1-3, respectively, as described herein. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

The migration source devices 1 . . . N 4100 and the migration target devices 1 . . . N 4200 can be mobile phones, laptops, notepads, touch pads, or any such device.

The migration cloud computing service 4300 can be allocation of on-demand computer system resources, data storage, cloud storage, and computing power as initiated for the migration process which provide the migration cloud computing services, where server systems, distributed computing systems, distributed server systems, and the like provide the resources as requested or required.

The migration controller 4320 is a stateless global service. The migration controller 4320 and services thereof will run on virtual machines. Its function is to keep track of all active migration jobs. It is the source of truth for application IDs (e.g., ecosystem IDs) and storage areas for each migration job. When a migration controller 4320 receives a new application request, it creates a unique application registration ID, storage space for the migration, records this information in a migration tablespace, and initiates a container or serverless function 4330 deployment with this information passed through.

The container or serverless function 4330 is initiated as a peer backend process handler for each migration job. Once initiated, it will contact the XAPP on the migration source devices 1 . . . N 4100, which has been in a waiting mode since initial contact to the cloud service 4300. It contacts the migration source devices 1 . . . N 4100 with its unique application registration ID as well as the storage keypath for replication.

The role of the load balancer 4340 is to perform application load balancing to allow massive scale of N number of migration jobs across N number of migration devices. It will balance requests into and across Y instances of the migration controllers 4340.

Each of the migration source devices 1 . . . N 4100 that are to be upgraded or migrated will have an XAPP installed on it to control the replication and synchronization. Upon initiation of the migration process, the respective migration source devices 1 . . . N 4100 will contact the migration cloud computing service 4300. The XAPP(s) on the respective migration source devices 1 . . . N 4100 will execute an initiation call (e.g., a "hello world" call) to the migration controller 4320 along with its calculated storage needs based on the selections for migration within the XAPP by the user (as described with respect to method 1000). Each XAPP on a migration source device 1 . . . N 4100 will have the migration controller (e.g., an instance of migration controller service) 4320 address coded onto it which will correspond to or with a load balancer service. The XAPP(s) on the respective migration source devices 1 . . . N 4100 will then go into a wait mode for further instructions by the migration controller 4320. Error handling and timeouts will be built in such that if this initial contact is disrupted by a network or other error, the XAPP(s) on the respective migration source devices 1 . . . N 4100 will automatically go out of wait mode, will generate a notification to the user that an error has occurred along with the error code, and will ask the user to attempt to initiate the migration again or to contact support.

Once the XAPP(s) on the respective migration source devices 1 . . . N 4100 receives its unique ID and storage keypath instructions, it will begin to copy data to the cloud data service 4310. The XAPP(s) on the respective migration source devices 1 . . . N 4100 will categorize the data buckets, e.g., such as contacts, files, etc., in the cloud data service 4310 in a manner that aligns to the migration target devices 1 . . . N 4200, respectively. If the XAPP(s) on the respective migration source devices 1 . . . N 4100 is replicating from/to similar platforms, such as iOS, the buckets will be mostly consistent. However, as an example, if XAPP(s) on the respective migration source devices 1 . . . N 4100 is replicating between Android and iOS, the XAPP(s) on the respective migration source devices 1 . . . N 4100 will categorize the buckets in a meaningful way that aligns best to the migration target devices 1 . . . N 4200, respectively.

A background monitoring service of the migration cloud computing service 4300, similar to a dispatch source, will be deployed for the files being copied. This mechanism will allow for differential/incremental file changes to be copied such that after a full initial copy is made, only files that are deleted, newly created, or modified will need to be copied. The background monitoring service may be implemented in or integrated with the migration controller or instance thereof 4320, the cloud data service 4310, or combinations thereof.

The XAPP will also be installed on the migration target devices 1 . . . N 4200. It may be the same XAPP, but when initiated it will be configured for behavior or operation on the migration target devices 1 . . . N 4200. With the target device persona, the XAPP on the migration target devices 1 . . . N 4200 will use the existing ecosystem ID to contact the migration cloud computing service 4300 and be given contact with an appropriate instance of the container or serverless function 1 . . . N 4330 and the cloud data service 4310 to initiate data transfer. The container or serverless function 1 . . . N 4330 will be periodically scanning the data for changes and will maintain a checklist of updates for the migration target devices 1 . . . N 4200 to apply (Copy, Update, Delete). The XAPP(s) on the migration target devices 1 . . . N 4200 will go through a continuous process of checking in with the container or serverless function 1 . . . N 4330 and will clear the tasks (Copy, Update, Delete) as it completes them.

Figure 5:
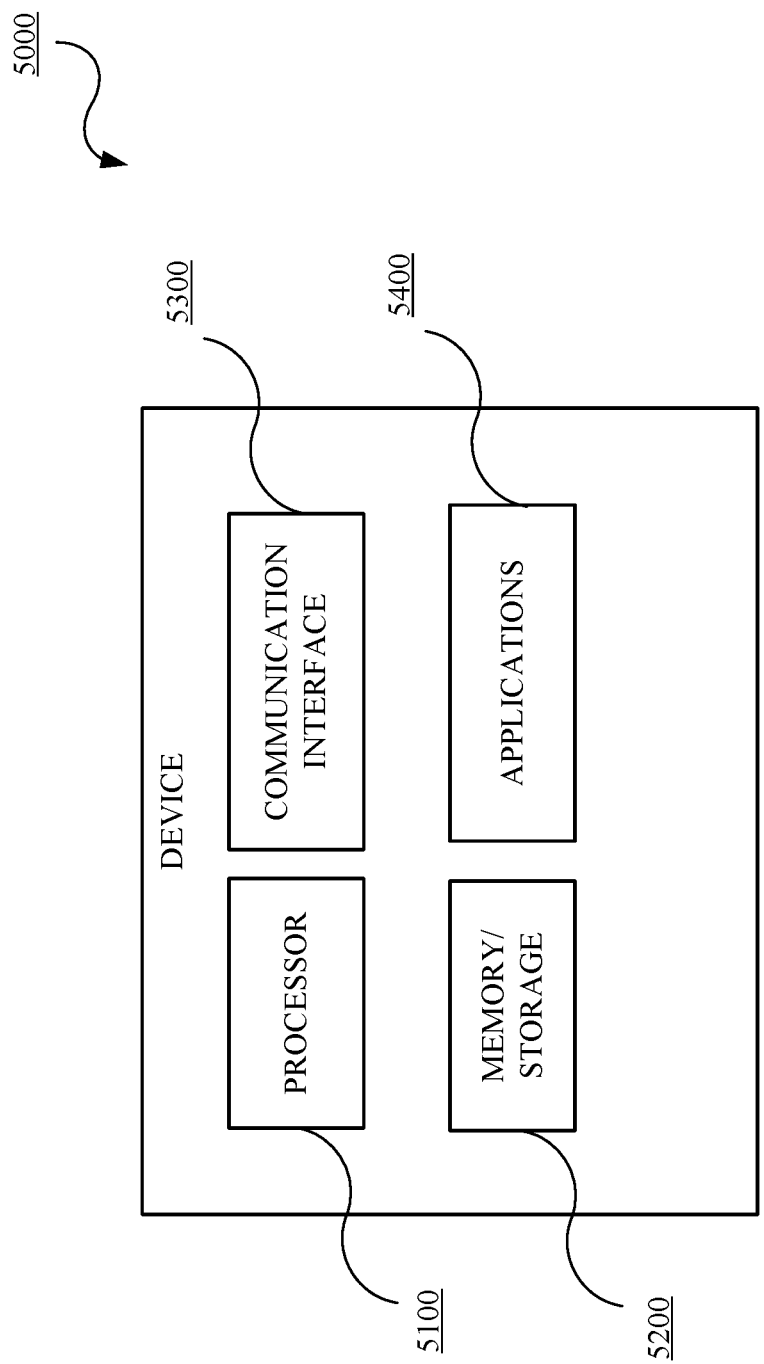
FIG. 5 is a block diagram of an example of a device in accordance with embodiments of this disclosure.

FIG. 5 is a block diagram of an example of a device 5000 in accordance with embodiments of this disclosure. The device 5000 may include, but is not limited to, a processor 5100, a memory/storage 5200, a communication interface 5300, and applications 5400. The device 5000 may include or implement, for example, target devices, source devices, and elements described herein. The applications 5400 can be the XAPP, for example. The device 5000 may include other elements which may be desirable or necessary to implement the devices, systems, compositions and methods described herein. The applicable or appropriate techniques or methods as described herein may be stored in the memory/storage 5200 and executed by the processor 5100 in cooperation with the memory/storage 5200, the communications interface 5300, and the applications 5400, as appropriate. The device 5000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A system for multi-device, multi-channel cloud-based differential data synchronization, the system comprising:
    a cloud-based migration system;
    a source device including a first migration application instance, the source device configured to execute the first migration application instance to initiate a first data transfer process with the cloud-based migration system to transfer user data to the cloud-based migration system upon a user ordering a target device but prior to the user physically touching the target device; and
    the target device including a second migration application instance, the target device configured to:
        execute the second migration application instance to initiate a second data transfer process with the cloud-based migration system to transfer the user data to the target device at manufacturing; and
        execute a final data transfer with the source device to finalize data synchronization upon receipt of the target device by the user.

2. The system of claim 1, the source device further configured to execute the first migration application instance to:
    execute an auto discovery on the source device to identify source device data; and categorize the source device data.

3. The system of claim 2, wherein the source device data includes data be copied with no format change and data to be replicated with format change.

4. The system of claim 3, wherein the source device uses a target device format for the data to be replicated with format change.

5. The system of claim 3, the source device further configured to execute the first migration application instance to:
    receive input for selection of data to be migrated.

6. The system of claim 4, the source device further configured to execute the first migration application instance to:
    receive input for workload prioritization as the source data is transferred to the cloud-based migration system.

7. The system of claim 5, wherein the workload prioritization is selected from one of balanced, priority to transfer, priority to non-transfer, and background processing.

8. The system of claim 1, wherein the first data transfer process and the second data transfer process occur prior to an arrival of shipment of the target device at a vendor location for user pickup.

9. The system of claim 1, wherein the first data transfer process and the second data transfer process occur at the manufacturing prior to arrival at a store.

10. A method for multi-device, multi-channel cloud-based differential data synchronization, the method comprising:
    initiating, by a migration application executing on a source device, a migration process upon ordering of a target device;
    scanning, by the migration application, source device data;
    listing, by the migration application, categories for the source device data;
    migrating, by the migration application to a cloud data service, selected source device data, wherein certain of the selected source device data is reformatted to meet the target device;
    transferring, by the migration application from the cloud data service to the target device, the selected source device data at manufacturing; and
    differential data synchronizing, by the migration application to a cloud data service, a migration application on the target device, and the cloud data service, upon receipt of the target device by a user.

11. The method of claim 10, further comprising:
    receiving, by the migration application executing on the source device, selection of data to be migrated.

12. The method of claim 11, further comprising:
    receiving, by the migration application executing on the source device, input for workload prioritization for transferring the source device data to the cloud data service.

13. The method of claim 12, wherein the workload prioritization is selected from one of balanced, priority to transfer, priority to non-transfer, and background processing.

14. The method of claim 12, wherein the transferring occurs prior to an arrival of shipment of the target device at a vendor location.

15. The method of claim 12, wherein the transferring at the manufacturing occurs prior to shipment of the target device from manufacturing.

16. A migration cloud computing service, comprising:
    a migration controller configured to receive a request for a migration process from a source device migration application on a source device;
    a backend process handler connected to the migration controller and a cloud data service, the backend process handler configured to send information regarding the cloud data service to the source device migration application based on information from the migration controller; and
    the cloud data service connected to the migration controller, the cloud data service configured to store migration data from the source device based on information from the migration controller and the backend process handler, wherein a portion of the migration data is received and transferred to a target device after a user ordering the target device and at manufacturing.

17. The service of claim 16, wherein some of the migration data is formatted with respect to the target device by the source device migration application.

18. The service of claim 17, wherein the backend process handler and cloud data service are configured to receive a request to start migrating the migration data to the target device from the target device migration application.

19. The service of claim 18, wherein the backend process handler and cloud data service and the target device migration application track state of migration data transfer.

20. The service of claim 19, wherein the backend process handler and cloud data service and the target device migration application are configured to execute a differential sync of the migration data upon receipt of the target device by the user based on the state of migration data transfer.

* * * * *